United States Patent
Henkel

(10) Patent No.: US 10,399,823 B2
(45) Date of Patent: Sep. 3, 2019

(54) CONVEYOR DRIVE UNIT WITH INITIALIZATION OF THE ADAPTIVE POWER SUPPLY UNIT AND IDENTIFICATION OF THE MOTOR

(71) Applicants: Otis Elevator Company, Farmington, CT (US); Reinhard Henkel, Berlin (DE)

(72) Inventor: Reinhard Henkel, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/755,351

(22) PCT Filed: Aug. 31, 2015

(86) PCT No.: PCT/EP2015/069833
§ 371 (c)(1),
(2) Date: Feb. 26, 2018

(87) PCT Pub. No.: WO2017/036509
PCT Pub. Date: Mar. 9, 2017

(65) Prior Publication Data
US 2018/0244502 A1    Aug. 30, 2018

(51) Int. Cl.
*B66B 1/30* (2006.01)
*B66B 1/32* (2006.01)
(Continued)

(52) U.S. Cl.
CPC ............ *B66B 25/003* (2013.01); *B65G 43/00* (2013.01); *B66B 1/30* (2013.01); *B66B 1/32* (2013.01);
(Continued)

(58) Field of Classification Search
CPC .. B66B 25/00; B66B 1/30; B66B 1/32; B66B 25/003; B66B 29/00; B66B 23/024;
(Continued)

(56) References Cited

U.S. PATENT DOCUMENTS 3,899,725 A  8/1975 Plunkett
4,276,500 A  6/1981 Sumka et al.
(Continued)

FOREIGN PATENT DOCUMENTS

CN  1037487 A  11/1989
EP  0924850 A2  6/1999
(Continued)

OTHER PUBLICATIONS

International Search Report and Written Opinion for application PCT/EP2015/069833, dated Jun. 9, 2016, 11 pages.
(Continued)

*Primary Examiner* — Mark A Deuble
(74) *Attorney, Agent, or Firm* — Cantor Colburn LLP

(57) ABSTRACT

A conveyor drive unit (1a; 1b), which is configured for driving a conveyor, comprises: a motor (14); an adaptive power supply unit (20), which is configured for supplying electrical energy to the motor (14); a safety chain/circuit (30), comprising at least one safety device (32, 34, 36) and being configured for ensuring a safe operation of the conveyor. The conveyor drive unit (1a; 1b) further comprises an initialization switch (28a; 28b), which is configured for selectively connecting the adaptive power supply unit (20) electrically with the motor (14) for initialization of the adaptive power supply unit (20) without bypassing or deactivating the safety chain/circuit (30).

13 Claims, 2 Drawing Sheets

Figure 1:
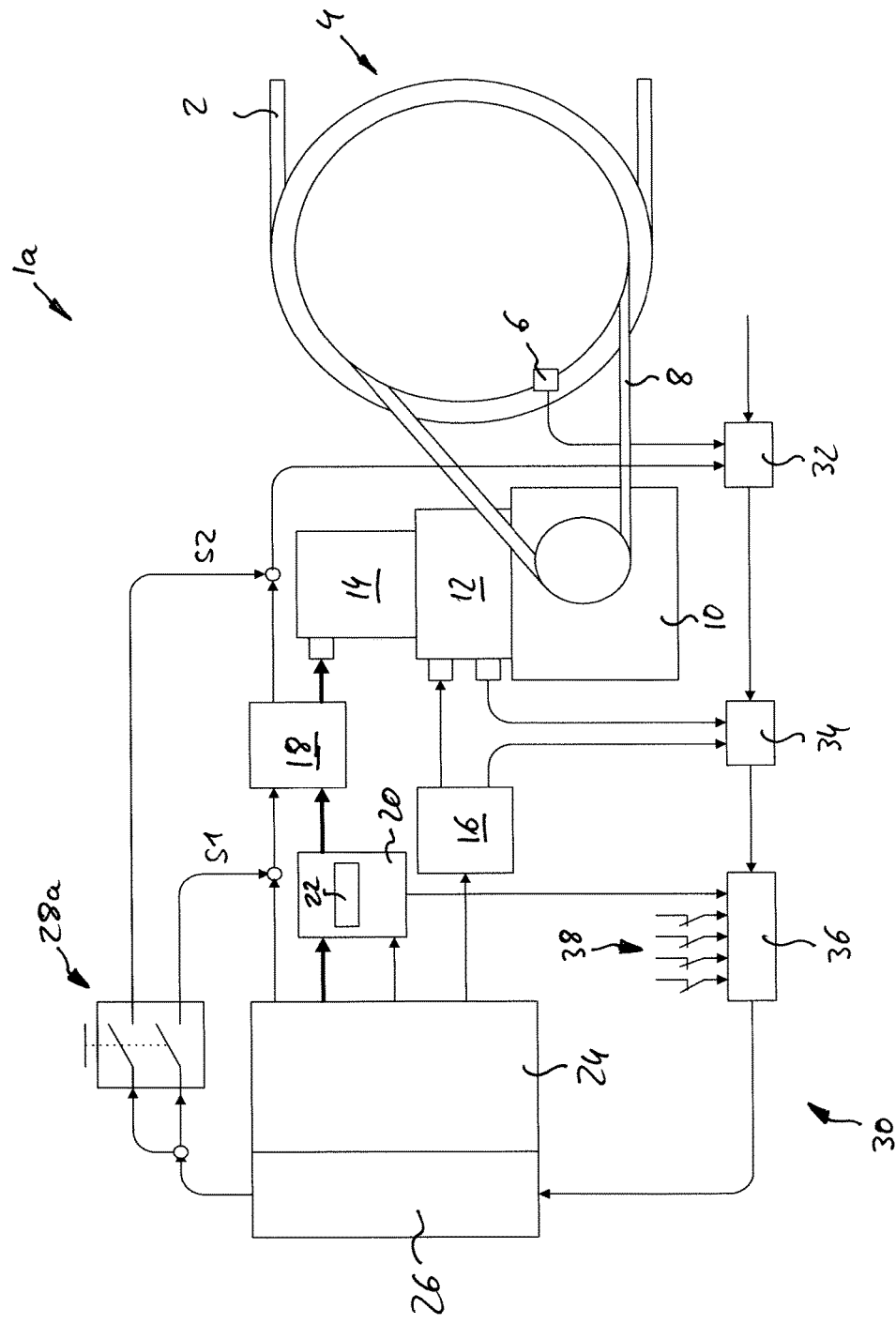

(51) Int. Cl.
*B65G 43/00* (2006.01)
*B66B 23/02* (2006.01)
*B66B 25/00* (2006.01)
*B66B 29/00* (2006.01)
*H02P 27/04* (2016.01)

(52) U.S. Cl.
CPC ............ *B66B 23/024* (2013.01); *B66B 25/00* (2013.01); *B66B 29/00* (2013.01); *H02P 27/045* (2013.01)

(58) Field of Classification Search
CPC ..... B66B 5/0043; B66B 5/005; H02P 27/045; B65G 43/00; B65G 43/04
See application file for complete search history.

(56) References Cited

U.S. PATENT DOCUMENTS

| | | | |
|---|---|---|---|
| 4,499,973 A | 2/1985 | De Lorenzi et al. | |
| 4,631,467 A | 12/1986 | Herrmann et al. | |
| 5,131,507 A | 7/1992 | Watanabe | |
| 5,526,256 A * | 6/1996 | Sakata | B66B 25/00 198/323 |
| 5,601,178 A | 2/1997 | Zaharia et al. | |
| 5,880,415 A | 3/1999 | Colby et al. | |
| 5,886,497 A | 3/1999 | Zaharia | |
| 6,049,189 A * | 4/2000 | Markus | B66B 25/00 198/322 |
| 6,273,234 B1 | 8/2001 | Balzer-Apke et al. | |
| 7,497,315 B2 | 3/2009 | Fargo et al. | |
| 8,997,968 B2 | 4/2015 | Braasch et al. | |
| 2010/0327795 A1* | 12/2010 | Jahkonen | B66B 25/00 318/504 |
| 2011/0120810 A1 | 5/2011 | Brumloop et al. | |
| 2013/0026001 A1 | 1/2013 | Gonzalez et al. | |
| 2013/0282167 A1* | 10/2013 | Nozaki | B65G 43/00 700/230 |
| 2014/0166434 A1* | 6/2014 | Liang | B66B 25/00 198/322 |
| 2014/0367206 A1 | 12/2014 | Della Porta et al. | |

FOREIGN PATENT DOCUMENTS

| | | | |
|---|---|---|---|
| EP | 1394097 A1 | 3/2004 | |
| GB | 2175761 A | 12/1986 | |
| JP | H09287799 A | 11/1997 | |
| WO | 9818711 A1 | 5/1998 | |

OTHER PUBLICATIONS

Chinese First Office Action for application CN 201580082762.3, dated Dec. 29, 2018, 5 pages.

* cited by examiner

CONVEYOR DRIVE UNIT WITH INITIALIZATION OF THE ADAPTIVE POWER SUPPLY UNIT AND IDENTIFICATION OF THE MOTOR

The invention relates to a conveyor drive unit for driving a conveyor, which is configured for conveying people and/or goods. The invention in particular relates to a conveyor drive unit comprising an adaptive power supply unit. The invention is also related to a method of initializing an adaptive power supply unit of such a conveyor drive unit.

Conveyors such as belt conveyors, escalators and/or moving walkways may be equipped with an adaptive power supply unit which needs to be initialized before starting to operate for the first time. The initialization in particular includes identifying the motor which is used for driving the conveyor.

The adaptive power supply unit in particular may be a so called variable voltage variable frequency (VVVF) drive, which is also called adjustable-frequency drive, variable-speed drive, AC drive, micro drive or inverter drive. This type of drive is configured for controlling the speed and the torque of an AC motor by varying the frequency and/or the voltage of the electrical power supplied to the motor.

In order to allow for the identification of the motor, the adaptive power supply unit usually is connected manually to the motor, bypassing the safety chain/circuit of the conveyor. During the identification, an electrical current is supplied from the adaptive power supply unit to the motor. This current, although usually small, may cause an unintended movement of the motor, resulting in a potentially dangerous movement of the conveyance elements of the conveyor, such as belts, steps, pallets and/or handrails.

It therefore is desirable to provide a conveyor drive unit comprising an adaptive power supply unit which may be initialized without deteriorating the safety of the conveyor.

Exemplary embodiments of the invention include a conveyor drive unit for driving a conveyor comprising: a motor; an adaptive power supply unit, which is configured for supplying electrical energy to the motor; a safety chain/circuit, comprising at least one safety device and being configured for ensuring a safe operation of the conveyor; and an initialization switch. The initialization switch is configured for selectively connecting the adaptive power supply unit electrically with the motor without bypassing or deactivating the safety chain/circuit.

Thus, for the identification of the motor during the initialization, the adaptive power supply unit is electrically connected to the motor without bypassing or deactivating the safety chain/circuit. Additionally, the initialization switch may be configured to deliver signals to components of the safety chain/circuit informing the components about the identification in order to avoid that a false alarm is triggered by the safety chain/circuit.

Exemplary embodiments of the invention also include a conveyor, in particular a people conveyor, comprising a conveyor drive unit according to an exemplary embodiment of the invention.

A method of initializing an adaptive power supply unit of a conveyor according to an exemplary embodiment of the invention comprises the step of electrically connecting the adaptive power supply unit with the motor for allowing the adaptive power supply unit to identify the motor without bypassing or deactivating the safety chain/circuit.

Initializing the adaptive power supply with the safety chain/circuit still being active allows a considerably safer initialization of the adaptive power supply, since the safety functions provided by the safety chain/circuit are not disabled but still active.

Exemplary embodiments of the invention will be described in the following with reference to the enclosed figures.

FIG. 1 schematically illustrates a conveyor drive unit according to a first exemplary embodiment of the invention.

Figure 2:
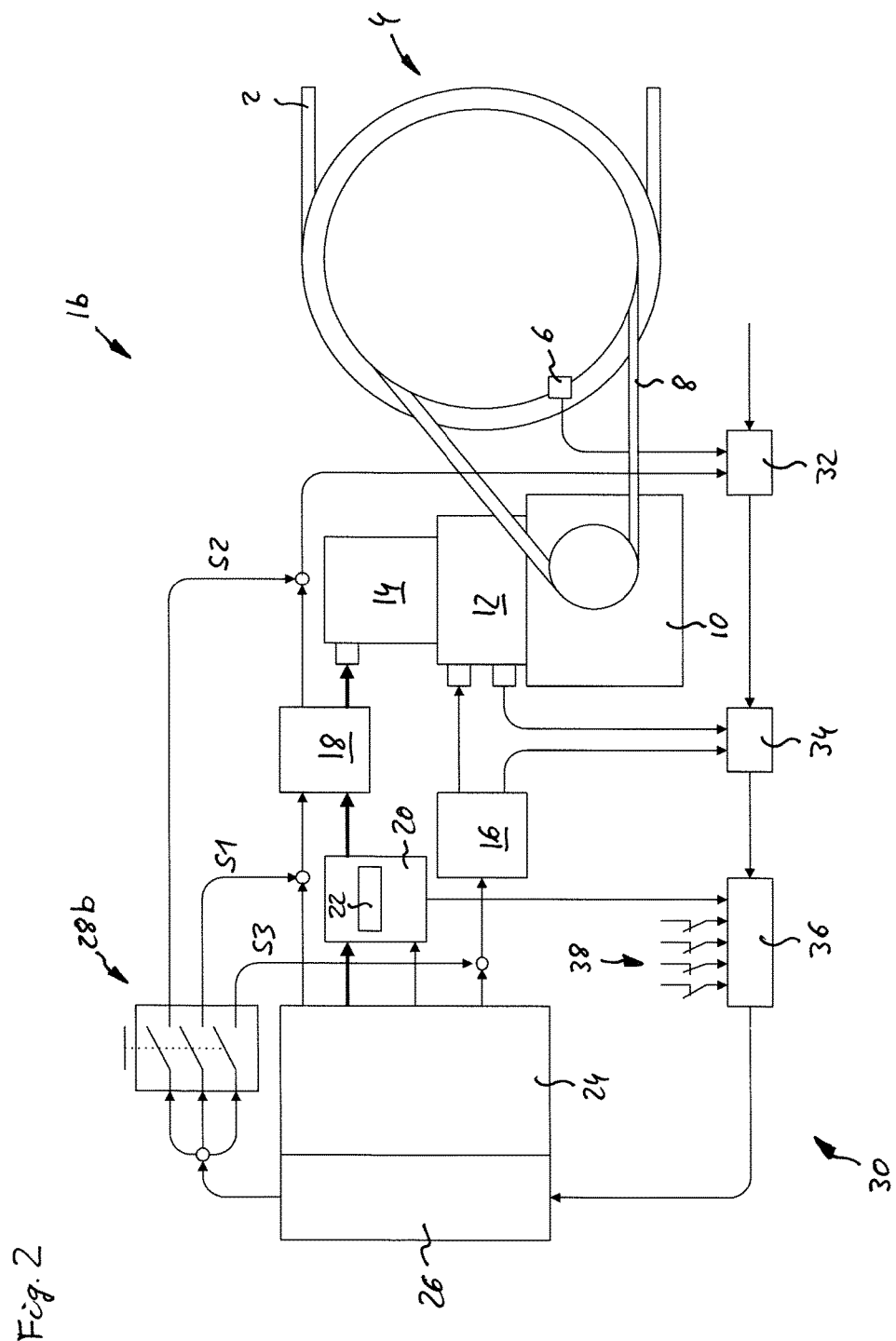

FIG. 2 schematically illustrates a conveyor drive unit according to a second exemplary embodiment of the invention.

FIG. 1 schematically illustrates a conveyor drive unit 1a according to a first exemplary embodiment of the invention.

A conveyance element 2, e.g. a belt in case of a belt conveyor, a step chain in case of an escalator, or a chain of pallets in case of a moving walkway, is arranged along a portion of the outer circumference of a circular main drive 4 allowing to drive the conveyance element 2 by rotating the main drive 4.

The main drive 4 is mechanically connected to a gearing 10 by means of a drive belt or chain 8. Alternatively this connection might be provided by an additional gear (not shown). The gearing 10 is drivable by means of a motor 14. The combination of the gearing 10 and the motor 14 sometimes is called escalator/moving walk-machine. A brake 12 is arranged between the motor 14 and the gearing 10. A brake control unit 16 is configured for driving the brake 12.

A speed sensor 6 is provided at the main drive 4 for detecting a rotational movement of the main drive 4. Alternatively, the speed sensor 6 might be located at another position where it allows to securely detect any movement of the conveyance element 2.

The motor 14 is controlled by a motor control unit 18 with the input side of said motor control unit 18 being electrically connected to the outlet side of an adaptive power supply unit 20, e.g. a VVVF drive unit. The adaptive power supply unit 20 is configured for providing electrical power with variable voltage and/or variable frequency for driving the motor 14.

The brake control unit 16, the motor control unit 18 and the adaptive power supply unit 20 are respectively connected to an operational control unit 24, which is configured for operating the conveyor drive unit 1a.

The operational control unit 24 is closely connected to or integrally provided with a safety circuit 26, which is configured for ensuring a safe operation of the conveyance device.

The safety circuit 26 in particular is electrically connected to a safety chain/circuit 30 comprising a plurality of safety devices 32, 34, 36. In case at least one of said safety devices 32, 34, 36 detects a malfunction of a safety relevant component of the conveyor drive unit 1a, it will interrupt the safety chain/circuit 30. In consequence, the safety circuit 26 will immediately stop any operation of the conveyor drive unit 1a in order to stop any movement of the conveyance element 2.

The safety chain/circuit 30 in particular comprises a standstill supervisor as a first safety device 32, which is configured for receiving an input signal from the speed sensor 6 in order to detect any movement of the main drive 4.

The safety chain/circuit 30 further comprises a brake supervisor as a second safety device 34, which is configured for receiving input signals from the brake control unit 16 and the brake 12 in order to determine whether the brake 12 is engaged or disengaged in agreement with the brake signal provided by the brake control unit 16. The brake supervisor 34 in particular is configured for reporting a malfunction of the brake 12 by interrupting the safety chain/circuit 30 when the brake signal provided by the brake control unit 16 indicates a status of the brake which is different from the status reported by the brake 12 itself.

The safety chain/circuit 30 also comprises a safety switch unit as a third safety device 36, which is electrically connected to the adaptive power supply unit 20 and/or a plurality of safety switches 38. Each of the safety switches 38 is configured to open in case of a malfunction of a component of the conveyance device. The safety switches 38 in particular may include at least one emergency switch, which is provided at the conveyor. An emergency switch allows passengers to stop the movement of the conveyor by activating the emergency switch in case of a dangerous situation.

The adaptive power supply unit 20 comprises at least one control device 22, in particular including a display, a key pad and/or a touchscreen, for allowing to control and in particular to initialize the adaptive power supply unit 20.

The conveyor drive unit 1a according to the first embodiment shown in FIG. 1 additionally comprises an initialization switch 28a, which is to be activated for identifying the motor 14 when initializing the adaptive power supply unit 20.

The initialization switch 28a in particular is configured for supplying a first signal S1 to the motor control unit 18, when activated. The first signal S1 provided by the initialization switch 28a causes the motor control unit 18 to electrically connect the adaptive power supply unit 20 with the motor 14 although no drive signal is provided from the operational control unit 24. Such an electrical connection between the adaptive power supply unit 20 and the motor 14 is necessary for allowing the adaptive power supply unit 20 to identify the motor 14 during the initialization.

The initialization switch 28a is further configured to provide a second signal S2 to the standstill supervisor 32. Said second signal S2 informs the standstill supervisor 32 that the initialization has been started.

In the first embodiment, as it is illustrated in FIG. 1, the brake 12 is engaged during the initialization. Thus, although the motor control unit 18 forwards an electrical signal from the adaptive power supply unit 20 to the motor 14, the motor 14 and in consequence also the main drive 4 are intended not to move during the initialization. By supplying the second signal S2, the standstill supervisor 32 is informed that any movement of the main drive 4 is to be considered as a malfunction, which shall result in an interruption of the safety chain/circuit 30 in order to abandon the initialization.

FIG. 2 illustrates a second embodiment of a conveyor drive unit 1b, which is configured for an alternative initialization.

The components which are identical to the components of the first embodiment illustrated in FIG. 1 are denoted with the same reference signs and will not be discussed in detail again.

As it has been discussed before, in the first embodiment of a conveyor drive unit 1a, as it is illustrated in FIG. 1, the brake 12 is engaged during the initialization in order to prevent any movement of the motor 14 and the main drive 4. A malfunction of the brake 12 or supplying a too large current to the motor 14 nevertheless may cause an undesired movement of the motor 14, the main drive 4 and the conveyance element 2. Such an undesired movement will be detected by the speed sensor 6 and the standstill supervisor 32 which will cause the initialization to be abandoned.

In the second embodiment of a conveyor drive unit 1b, as it is shown in FIG. 2, the brake 12 is disengaged (released) during the identification of the motor 14 allowing the motor 14 and the main drive 4 to move.

Allowing the motor 14 to move during the identification may result in better data being achieved.

In order to disengage the brake 12, the initialization switch 28b according to the second embodiment provides a third signal S3 to the brake control unit 16, when activated. Said third signal S3 instructs the brake control unit 16 to disengage the brake 12.

When the brake 12 is disengaged, the electrical energy provided via the motor control unit 18 from the adaptive power supply unit 20 to the motor 14 during the identification of the motor may cause (small) movements of the motor 14 and in consequence also (small) movements of the drive unit 4, which is mechanically connected to the motor 14 by means of the drive belt or chain 8. In the configuration according to the second embodiment the standstill supervisor 32 is configured to interrupt the safety chain/circuit 30 only in case the movement of the main drive 4, which is detected by the speed sensor 6 during the initialization, exceeds a predetermined threshold. As in the first embodiment, a second signal S2 provided by the initialization switch 28b, when activated, informs the standstill supervisor 32 about the initialization.

The functionality of the additional components 34, 36 of the safety chain/circuit 30 is identical to the first embodiment, which is shown in FIG. 1 and has been described before.

In conveyor drive units 1a, 1b according to exemplary embodiments of the invention, the safety chain/circuit 30 is still active during the initialization of the adaptive (VVVF) drive unit including an identification of the motor and continues to monitor the operation of the conveyance device and its components. In consequence, any malfunctions occurring during the initialization will be detected, the safety chain/circuit 30 will be interrupted and the initialization will be abandoned.

As a result, the safety during the initialization is considerably enhanced compared to a situation, in which the safety chain/circuit 30 is bypassed or deactivated during the initialization. Thus, conveyor drive units 1a, 1b according to exemplary embodiments of the invention allow a safe initialization of an adaptive power supply unit 20 with or without releasing the brake 12.

In order to avoid any disturbance of the initialization, the adaptive power supply unit 20 may be configured not to accept any external control commands, in particular commands provided from the operational control unit 24, while performing the initialization.

Additionally or alternatively, an additional signal (not shown) may be supplied from the initialization switch 28a, 28b to the operational control unit 24 in order to ensure that no control commands are generated by the operational control unit 24 during the initialization.

The initialization switch 28a, 28b may be configured as a push button, which is activated only as long as it is pushed. In consequence, the initialization will be abandoned and normal operation of the conveyor may resume as soon as the initialization switch 28a, 28b is released.

Further Embodiments:

A number of optional features are set out in the following. These features may be realized in particular embodiments, alone or in combination with any of the other features.

In an embodiment the initialization switch is configured for causing electrical energy to be supplied from the adaptive power supply unit to the motor during the initialization. This allows the adaptive power supply unit to identify the motor without a control signal for running the motor being present. In consequence, the adaptive power supply unit may identify the motor while the conveyor remains in a deactivated (stopped) state.

In an embodiment the initialization switch is configured for supplying a signal to the safety chain/circuit indicating that the motor/main drive is not intended to move during the identification of the motor. During the identification of the motor usually a (small) electrical current is supplied to the motor. In an embodiment the motor/main drive, however, is intended not to move. By supplying a signal to the safety chain/circuit indicating that the motor/main drive is not intended to move, the safety chain/circuit will open and abandon the initialization in case an undesired movement of the motor/main drive is detected. This enhances the safety of the initialization, as any undesired movement of the motor/main drive is reliably prevented. Alternatively, the safety chain/circuit may be configured to open in case a detected movement of the motor/main drive exceeds a predetermined threshold in order to allow small movements of the of the motor/main drive. Allowing small movements of the motor/main drive might be beneficial for optimizing the identification of the motor.

In an embodiment at least one brake is configured for preventing any movement of the motor/main drive during the identification of the motor. This enhances the safety of the identification even further, as any undesired movement of the motor/main drive is reliably prevented by means of the at least one brake.

In an alternative embodiment the initialization switch is configured for providing a signal for releasing the brake during the identification of the motor. In some type of identification, small movements of the motor may be desirable. Releasing the brake allows for such small movements of the motor.

In an embodiment at least one of the safety devices of the safety chain/circuit comprises at least one brake supervisor device, which is configured for supervising the operation of the brake. Supervising the operation of the brake allows for abandoning the initialization/identification in case a malfunction of the brake is detected.

In an embodiment at least one of the safety devices of the safety chain/circuit comprises a standstill supervisor, which is configured for detecting any movement of the motor and/or the main drive. This allows for abandoning the initialization/identification in case an undesired movement of the motor and/or the main drive is detected or in case the amplitude of the movement of the motor and/or the main drive is detected to exceed a predetermined threshold.

In an embodiment the initialization switch is configured for preventing any external control commands from being sent to the adaptive power supply unit during the initialization. This reliably prevents the initialization from being disturbed by any external control commands.

In an embodiment the adaptive power supply unit is configured not to accept any external control commands during the initialization in order to avoid any disturbance of the initialization by external control commands.

In an embodiment the initialization switch is not activated in normal operation but needs to be pushed to be activated, and it returns to a deactivated state as soon as it is released. This kind of configuration of the initialization switch reliably avoids that the initialization switch remains in the activated state and prevents a normal operation of the conveyor longer than necessary.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the claims.

REFERENCES 1a conveyor drive unit (first embodiment)
1b conveyor drive unit (second embodiment)
2 conveyance element
4 main drive
6 speed sensor
8 drive belt/chain
10 gearing
12 brake
14 motor
16 brake control unit
18 motor control unit
20 adaptive drive unit
22 control device
24 operational control unit
26 safety circuit
28a initialization switch (first embodiment)
28b initialization switch (second embodiment)
30 safety chain/circuit
32 standstill supervisor/first safety device
34 brake supervisor/second safety device
36 safety switch unit/third safety device
38 safety switches

The invention claimed is:

1. Conveyor drive unit for driving a conveyor comprising:
   a motor;
   an adaptive power supply unit configured for supplying electrical energy to the motor;
   a safety chain/circuit comprising at least one safety device and being configured for ensuring a safe operation of the conveyor; and
   an initialization switch, which is configured for selectively connecting the adaptive power supply unit electrically with the motor for initialization of the adaptive power supply unit without bypassing or deactivating the safety chain/circuit;
   wherein the initialization switch is configured for supplying a signal (S2) to the safety chain/circuit indicating that the motor is intended not to move more than a predetermined amount during the initialization.

2. Conveyor drive unit of claim 1, wherein the initialization switch is configured for causing electrical energy to be supplied from the adaptive power supply unit to the motor during the initialization.

3. Conveyor drive unit of claim 1 further comprising at least one brake which is configured for preventing any movement of the motor during the initialization.

4. Conveyor drive unit of claim 3, wherein the initialization switch is configured to provide a signal for releasing the brake during the initialization.

5. Conveyor drive unit of claim 3, wherein the safety devices include a brake supervisor, which is configured for supervising the operation of the brake.

6. Conveyor drive unit of claim 1, wherein the initialization switch is not activated during normal operation and returns to a deactivated state as soon as it is released.

7. Conveyor comprising a conveyor drive unit according to claim 1.

8. Conveyor drive unit for driving a conveyor comprising:
a motor;
an adaptive power supply unit configured for supplying electrical energy to the motor;
a safety chain/circuit comprising at least one safety device and being configured for ensuring a safe operation of the conveyor; and
an initialization switch, which is configured for selectively connecting the adaptive power supply unit electrically with the motor for initialization of the adaptive power supply unit without bypassing or deactivating the safety chain/circuit;
wherein the safety devices include a standstill supervisor, which is configured for detecting any movement of the motor.

9. Conveyor drive unit for driving a conveyor comprising:
a motor;
an adaptive power supply unit configured for supplying electrical energy to the motor;
a safety chain/circuit comprising at least one safety device and being configured for ensuring a safe operation of the conveyor; and
an initialization switch, which is configured for selectively connecting the adaptive power supply unit electrically with the motor for initialization of the adaptive power supply unit without bypassing or deactivating the safety chain/circuit;
wherein the adaptive power supply is configured not to accept any external control commands during the initialization, and/or wherein the initialization switch is configured for preventing any external control commands to be sent to the adaptive power supply unit during the initialization.

10. Method of initializing an adaptive power supply unit of a conveyor drive unit, which is configured for driving a conveyor and comprises:
a motor;
an adaptive power supply unit which is configured for supplying electrical energy to the motor;
a safety chain/circuit, comprising at least one safety device and being configured for ensuring a safe operation of the conveyor;
wherein the method comprises electrically connecting the adaptive power supply unit with the motor without bypassing or deactivating the safety chain/circuit;
wherein the method comprises preventing that control signals are supplied to the adaptive power supply during the initialization.

11. Method of claim 10 wherein the method comprises supplying electrical energy from the adaptive power supply unit to the motor during the initialization.

12. Method of claim 10, wherein the method comprises supplying a signal to the safety chain/circuit indicating that the motor is intended not to move more than a predetermined amount, which in particular may be zero, during the initialization.

13. Method of claim 10, wherein the method comprises releasing a brake, which is configured for preventing the motor from rotating, during the initialization.

* * * * *